(12) United States Patent
Flurry et al.

(10) Patent No.: US 7,530,099 B2
(45) Date of Patent: May 5, 2009

(54) METHOD AND SYSTEM FOR A SINGLE-SIGN-ON MECHANISM WITHIN APPLICATION SERVICE PROVIDER (ASP) AGGREGATION

(75) Inventors: Gregory Alan Flurry, Austin, TX (US); Bill Lawton, Georgetown, TX (US); Stewart Earle Nickolas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 09/965,736

(22) Filed: Sep. 27, 2001

(65) Prior Publication Data

US 2003/0061512 A1   Mar. 27, 2003

(51) Int. Cl.
*H04L 29/06* (2006.01)
(52) U.S. Cl. ............................. 726/8; 726/10
(58) Field of Classification Search ............... 713/168, 713/182–183, 200–201; 709/225, 229
See application file for complete search history.

(56) References Cited

U.S. PATENT DOCUMENTS

| 5,241,594 | A | 8/1993 | Kung | 380/4 |
|---|---|---|---|---|
| 5,928,363 | A | 7/1999 | Ruvolo | 713/201 |
| 6,049,877 | A | 4/2000 | White | 713/201 |
| 6,185,316 | B1 | 2/2001 | Buffam | 382/115 |
| 6,226,752 | B1 * | 5/2001 | Gupta et al. | 713/201 |
| 6,421,768 | B1 * | 7/2002 | Purpura | 711/164 |
| 6,584,505 | B1 * | 6/2003 | Howard et al. | 709/225 |
| 6,668,322 | B1 * | 12/2003 | Wood et al. | 713/182 |
| 7,137,006 | B1 * | 11/2006 | Grandcolas et al. | 713/180 |
| 7,174,383 | B1 * | 2/2007 | Biswas et al. | 709/229 |
| 7,231,661 | B1 * | 6/2007 | Villavicencio et al. | 726/4 |

(Continued)

FOREIGN PATENT DOCUMENTS

EP   001089516 A2 *   4/2001

OTHER PUBLICATIONS

Samar, "Single Sign-On Using Cookies for Web Applications", IEEE, 1999, Retrieved from the Internet on Aug. 30, 2007: <URL:http://ieeexplore.ieee.org/xpls/abs_all.jsp?arnumber=805192>.*

(Continued)

*Primary Examiner*—Gilberto Barron, Jr.
*Assistant Examiner*—Minh Dinh
(74) *Attorney, Agent, or Firm*—Hamilton & Terrile, LLP; Gary W. Hamilton

(57) ABSTRACT

A methodology for providing a single-sign-on mechanism within an ASP aggregator service is presented. An aggregator token is generated by an ASP aggregator service and sent to a client device after its user has been successfully authenticated during a single-sign-on operation that is provided by the ASP aggregator service. The aggregator token then accompanies any request from the client to aggregated applications within the ASP aggregator service's infrastructure. The aggregator token comprises an indication of an address or resource identifier within the ASP aggregator service to which a client/user can be redirected when the client/user needs to be authenticated by the ASP aggregator service. In other words, the address/identifier is associated with a logon resource; when a request from a client is sent to this address, the ASP aggregator service responds with an authentication challenge to force the user to complete a single-sign-on operation.

1 Claim, 8 Drawing Sheets

U.S. PATENT DOCUMENTS

2002/0010776 A1* 1/2002 Lerner ........................ 709/225
2002/0029269 A1* 3/2002 McCarty et al. ............. 709/225

OTHER PUBLICATIONS

Gutzmann, "Access Control and Session Management in the HTTP Environment", IEEE, Feb. 2001, Retrieved from the Internet on Jun. 14, 2008: <URL: http://ieeexplore.ieee.org/iel5/4236/19370/00895139.pdf?tp=&isnumber=&arnumber=895139>.*

Samar, "Single Sign-On Using Cookies for Web Applications", IEEE, 1999, Retrieved from the Internet on Jun. 14, 2008: <URL: http://ieeexplore.ieee.org/iel5/6520/17409/00805192.pdf?tp=&isnumber=&arnumber=805192>.*

Cover, "The XML Cover Pages: Security Assertion Markup Language (SAML)", http://www.oasis-open.org/cover/saml.html. Jul. 24, 2001.

Hallam-Baker, "Security Assertions Markup Language", Draft Version 0.1, Feb. 16, 2001.

"Security Services Markup Language", http://www.s2ml.org, Jan. 8, 2001.

Orchard, "ITML Message and Protocol Specification", Working Draft, Version 0.8, Nov. 22, 2000.

Web pages from www.jamcracker.com, Jan. 2001.

"Jamcracker White Paper: Platform Security", Jamcracker, Inc., Jan. 2001.

* cited by examiner

METHOD AND SYSTEM FOR A SINGLE-SIGN-ON MECHANISM WITHIN APPLICATION SERVICE PROVIDER (ASP) AGGREGATION

BACKGROUND OF THE INVENTION

1. Field of the Invention

The present invention relates to an improved data processing system and, in particular, to a method and apparatus for multicomputer data transferring. Still more particularly, the present invention provides a method and apparatus for computer-to-computer authentication management.

2. Description of Related Art

In order to obtain operational efficiencies and reduce operating expenses, enterprises continue to adopt management practices that focus on core business opportunities while outsourcing nonessential functions, such as human resources, payroll, and accounting. One of the many ways in which Internet-centric technologies have enhanced productivity is the facilitation of outsourced services for information technology (IT) management. Many Web-based Application Service Providers (ASPs) host, manage, and rent software applications at a central location on an outsourced basis, thereby providing several benefits to the enterprise customers of the ASPs. In addition to reducing IT management costs, users can access the hosted applications through standard Internet connections and Web browsers, and users can easily collaborate through a shared application even if separated by vast distances.

While ASPs can provide many benefits to enterprises, certain IT issues can continue to vex an enterprise even after outsourcing software applications. For example, in order for users to be presented with a coherent set of IT resources, an enterprise may need to host legacy applications that need to be integrated with the ASPs in some manner while also integrating the ASPs themselves. In addition, information security may also continue to be problematic, and security risks could actually increase by introducing an insecure infrastructure.

Moreover, corporate call centers have been found to spend a significant amount of resources resolving user password issues, and poor IT resource integration may actually increase user support costs because access management issues could become more complicated rather than more simplified with the introduction of an additional layer of security and an increased number of, user identities and passwords.

To resolve some of these issues, several companies have extended the concept of an ASP to introduce an additional layer of software integration. While an ASP may rent a single "net-sourced" application to its subscribers, additional value can be added by providing common user registration, common billing, and a common login for a set of net-sourced applications based on an ASP infrastructure.

There are two major models for maintaining an ASP infrastructure. An ASP integrator hosts the net-sourced applications as well as the ASP infrastructure, and the hosted applications are written or modified to integrate with the ASP infrastructure, thereby greatly simplifying the task of offering common services but also increasing the resource and management requirements of the ASP integrator. Alternatively, an ASP aggregator allows its subscribers to access multiple net-sourced applications that are hosted by a variety of ASPS; these ASPs may be independent third parties that host a single net-source application, or one or more of these ASPs may be an ASP integrator. In either case, the aggregated applications are typically not modified to use the infrastructure of the ASP aggregator. Instead, one or more adapters, typically created by the ASP aggregator, are used with the host applications to achieve the desired common services. Generally, aggregating net-sourced applications can reduce resource and management requirements while interfacing with a broader range of applications.

Single-sign-on is one of the key requirements of an ASP aggregator; otherwise, it may be difficult to enhance user productivity and to achieve reduced user support costs. Single-sign-on has been described as a fundamental goal in current and future implementations of access management applications; using a single-sign-on mechanism, a user can perform a single login operation for the purpose of authentication and can then access multiple applications thereafter without subsequent authentication operations. With respect to an ASP aggregator, a user can perform a single login operation to the ASP infrastructure and can access thereafter any of the multiple, aggregated, net-sourced applications during the same session.

While an ASP aggregator can enhance the efficiency of IT management, certain access management problems can still occur. Specifically, it may be assumed that an ASP aggregator maintains and controls a single-sign-on operation on behalf of a user, thereby presenting a common access mechanism that allows the user to access any application in a set of aggregated, hosted applications to which a user has subscribed. However, after the user successfully completes an authentication operation during a single-sign-on operation, the user is considered to be properly authenticated only during the particular ASP aggregator session that is associated with the single-sign-on operation.

Through ordinary operations of a client application, though, a user can save some form of session-specific information concerning an aggregated application during a session within the ASP infrastructure, i.e. after the user has been authenticated by the ASP aggregator and has been allowed to access a hosted application. After the session has expired, the user may try to use the saved session-specific information either by trying to re-establish a session directly with the aggregated application or by merely attempting to interact directly with the aggregated application at some later point in time. In either case, the user is presented with an error since the hosted application no longer recognizes the saved session-specific information as valid, generally because it is not valid across multiple sessions.

This type of access management problem occurs because the ASP aggregator model inherently presents a form of middleware between the user and the host application. The single-sign-on mechanism is controlled and managed by the ASP aggregator, yet the aggregated applications are distinct entities that have some degree of independence from the ASP aggregator infrastructure. Hence, while the user is interacting directly with an aggregated application, a user has the ability to save some form of session-specific information concerning the aggregated application outside of the control of the ASP infrastructure.

Therefore, it would be advantageous to provide a method and a system for a single-sign-on mechanism within an ASP aggregator infrastructure that recovers from a scenario in which a user attempts to re-use saved session-specific information directly with a hosted application. It would be particularly advantageous if the method and the system maintained a coherent interface between the user and the ASP infrastructure.

SUMMARY OF THE INVENTION

The present invention is a method, system, apparatus, or computer program product for providing a single-sign-on mechanism within an ASP aggregator service. An aggregator token is generated by an ASP aggregator service and sent to a client device after its user has been successfully authenticated during a single-sign-on operation that is provided by the ASP aggregator service. The aggregator token then accompanies any request from the client to aggregated applications within the ASP aggregator service's infrastructure. The aggregator token comprises an indication of an address or resource identifier within the ASP aggregator service to which a client/user can be redirected when the client/user needs to be authenticated by the ASP aggregator service. In other words, the address/identifier is associated with a logon resource; when a request from a client is sent to this address, the ASP aggregator service responds with an authentication challenge to force the user to complete a single-sign-on operation.

If an aggregated application (or an ASP that is supporting the aggregated application) determines that the client/user has not been properly authenticated and should not receive access to the aggregated application as requested within a request message that is received from the client/user, then the aggregated application (or its supporting ASP) can redirect the client/user to the logon resource that is indicated by the aggregator token. The redirectable message may itself include an address to which the ASP aggregator service should redirect the client/user after being authenticated so that the user may begin interacting with the desired application.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention is directed to a system and a methodology for secure client-server access management. Computers that implement the present invention may be dispersed throughout a network or distributed data processing system. As background, a typical organization of hardware and software components within a distributed data processing system is described prior to describing the present invention in more detail.

Figure 1A:
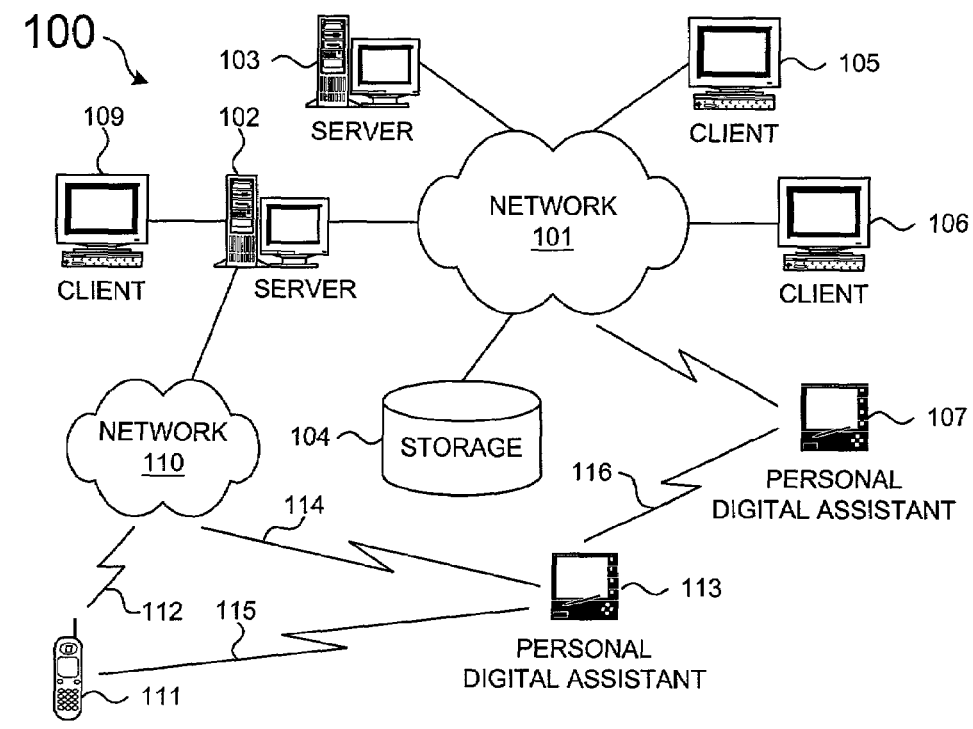
FIG. 1A depicts a typical network of data processing systems, each of which may implement the present invention.

With reference now to the figures, FIG. 1A depicts a typical network of data processing systems, each of which may contain and/or operate the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
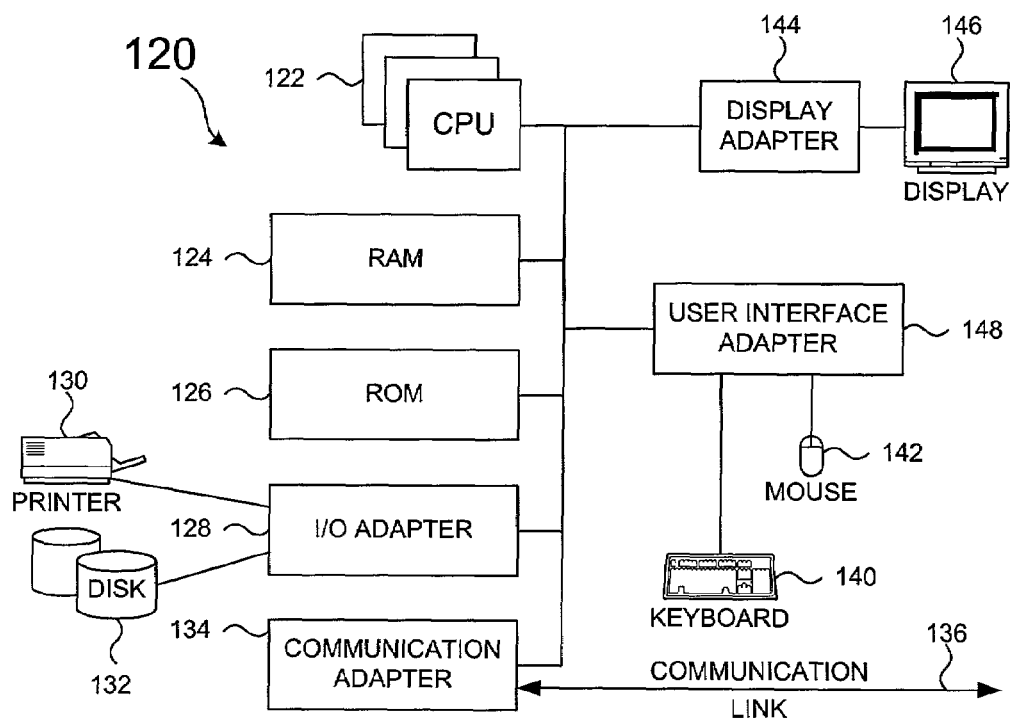
FIG. 1B illustrates a typical Web-based environment in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, including a digital signal processor (DSP) and other types of special purpose processors, and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing documents and processing messages in a variety of formats, such as graphic files, word processing files, Extensible Markup Language (XML), Hypertext Markup Language (HTML), Handheld Device Markup Language (HDML), Wireless Markup Language (WML), Security Assertion Markup Language (SAML), and various other formats and types of files.

Given the background information provided above, a typical ASP aggregator service is described in association with the following FIGS. 2A-2B and FIGS. 3A-3E; a typical ASP aggregator service may be implemented in a variety of forms and models in accordance with open standards or proprietary technology. After discussing a typical ASP aggregator service, the present invention will be described in more detail.

Figure 2A:
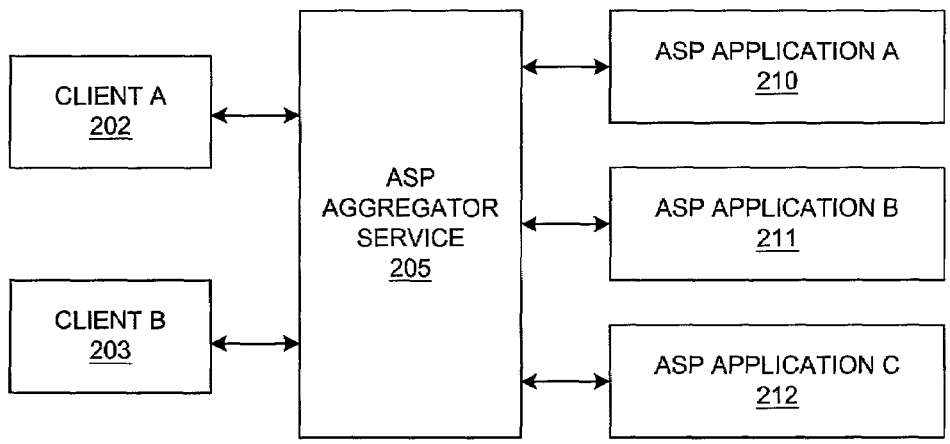
FIG. 2A is a diagram that depicts a typical organization of entities with respect to an Application Service Provider (ASP) aggregator service.

With reference now to FIG. 2A, a typical organization of entities is shown with respect to an Application Service Provider (ASP) aggregator service. Clients 202-203 interact with ASP aggregator service 205, which provides an aggregation service for ASP applications 210-212. ASP applications 210-212 are applications that are hosted on a central server and accessed by clients 202-203 through a network, such as network 101 shown in FIG. 1; hence, applications 210-212 may be described as "hosted applications" or "net-sourced applications" to distinguish them from applications that reside at a client. Additionally, in an attempt to increase efficiencies and productivity, ASP aggregator service 205 centralizes access management for applications 210-212 by providing a single authentication gateway for users that want to access the applications. Hence, applications 210-212 may also be described as "aggregated applications". It may be assumed that ASP aggregator service 205 provides some form of single-sign-on functionality.

Figure 2B:
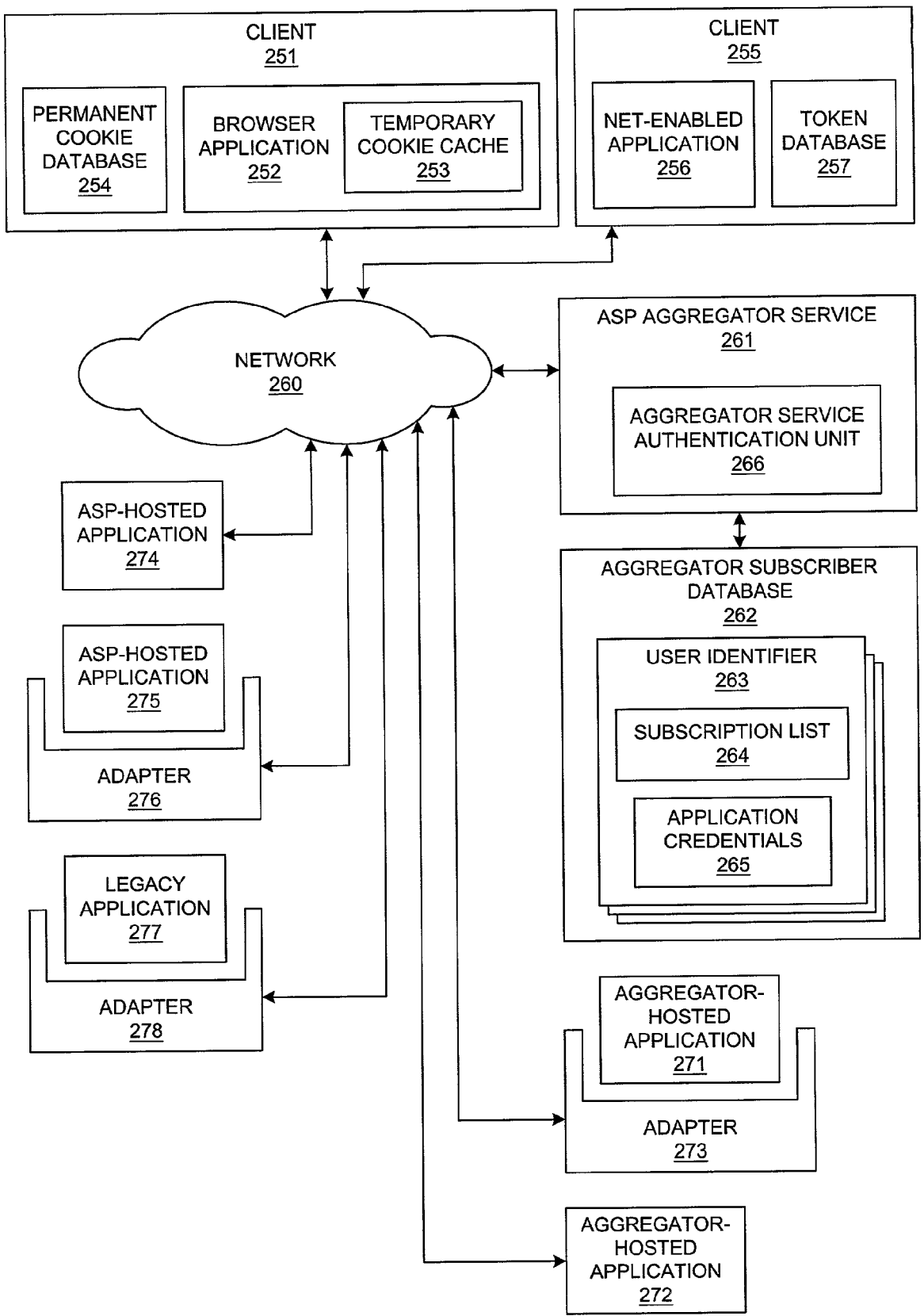
FIG. 2B is a diagram that depicts a typical ASP aggregator service and its relationships with clients and net-sourced applications in more detail than in FIG. 2A.

With reference now to FIG. 2B, a typical ASP aggregator service and its relationships with clients and net-sourced applications are shown in more detail than in FIG. 2A. FIG. 2B illustrates the variety of application configurations that may be supported by a typical ASP aggregator service. Because the present invention may be implemented into the infrastructure of a typical ASP aggregator service, the present invention may also support a wide variety of application configurations. In order to provide background information for the variety of contexts in which the present invention may be implemented, a subset of these configurations are described below. However, the depicted examples are not meant to imply architectural or functional limitations with respect to the present invention.

Client 251 supports browser application 252, which maintains temporary cookie cache 253 and permanent cookie database or file 254 for storing cookies that have been received from servers, as is well-known in the art. In order to depict a more generalized client application environment, FIG. 2B shows client 255 supporting net-enabled application 256 that may be used by a user of client 255 to perform functional operations through a connected network. Net-enabled application 255 itself may be temporary by being downloaded through a connected network. Net-enabled application 256 may store tokens, such as authentication tokens that have been received from servers, in token database 257.

Via network 260, client 251 or client 255 may access ASP aggregator service 261. It may be assumed that a user of a client device has already established some type of account with the ASP aggregator service, e.g., by registering with the ASP aggregator service and paying a subscription fee, after which the ASP aggregator service has generated a user identity for the user and appropriate credentials for authenticating the user's identity when the user presents a request for access to resources protected by ASP aggregator service 261.

In this example, ASP aggregator service 261 uses aggregator subscriber database 262 to store user identifier information 263, which is associated with subscription list 264 and application credentials 265. Subscription list 264 indicates the set of applications to which a user has previously requested to access through the aggregator service, i.e. the set of aggregated applications to which the user has subscribed. Each of the aggregated applications may require an application credential 265 that the ASP aggregator must present to an aggregated application when attempting to complete an authentication operation with the aggregated application on behalf of the user.

When a user logs into the ASP aggregator service, the user is authenticated with respect to the ASP aggregator service using the aggregator service authentication unit 266. After a user successfully completes the ASP aggregator service's authentication operation, the ASP aggregator service attempts to authenticate the user with respect to each of the user's subscribed applications as necessary.

ASP aggregator service 261 may aggregate a variety of net-sourced applications, as briefly mentioned with respect to FIG. 2A. In FIG. 2B, the aggregated applications are shown as being accessible through network 260; these applications may be distributed throughout the network and do not necessarily have to be physically located on servers that are operated by the ASP aggregator service. However, these application must have an appropriate interface that allows the ASP aggregator service to communicate with them or their supporting frameworks such that the ASP aggregator service can perform authentication operations with the applications on behalf of customers of the ASP aggregator service.

In the exemplary organization shown in FIG. 2B, aggregator-hosted applications 271 and 272 may be supported on a server that is physically maintained by the ASP aggregator service; these applications are shown as being generically accessed through network 260 because the applications may not be physically co-located with servers that support the majority of the functionality of ASP aggregator service 261. In the case of application 271, adapter 273 has been written and interfaced with application 271 to provide the necessary functionality that allows the ASP aggregator service to perform authentication functions on behalf of a user. In contrast, application 272 may have been originally implemented in accordance with open standards that allow the ASP aggregator service to perform its desired single-sign-on operations.

In a manner similar to aggregator-hosted applications 271-272, ASP-hosted applications 274-275 may also be accessible through network 260 and may also be distinguishable by the fact that application 274 already has the necessary authentication functionality whereas application 275 must be accessed through adapter 276. However, applications 274-275 may be supported on servers that are physically maintained by one or more ASPs. In other words, a user could access net-sourced applications 274-275 on a subscription basis independently through one or more ASPs without the agency of ASP aggregator service 261.

Legacy application 277 may be supported on a server that is physically maintained on a server that is operated by a customer of the ASP aggregator service. For example, the customer may not have desired (or may not have been able) to relinquish control over a legacy application by porting it to a server operated by ASP aggregator service 261. In this example, however, the customer has incorporated single-sign-on functionality with the legacy application through the ASP aggregator service by interfacing adapter 278 with the legacy application for that purpose.

Using the environment shown in FIG. 2B, the users of the client devices may be given the impression that they are only interacting with the ASP aggregator service even though the user may be interacting with a variety of applications that are supported on multiple, distinct, physically dispersed servers. For example, using browser application 252, a user may select or enter a Uniform Resource Locator (URL), or more generally, a Uniform Resource Identifier (URI), that directs the browser application to the ASP aggregator service. After that point in time, the user does not need to be cognizant of the Domain Name System (DNS) addresses that are used to present an integrated interface to the user's subscribed, aggregated applications. FIGS. 3A-3D show some of the typical Web pages that may be presented to a user within a typical browser application while using the single-sign-on functionality of a typical ASP aggregator application.

Figure 3A:
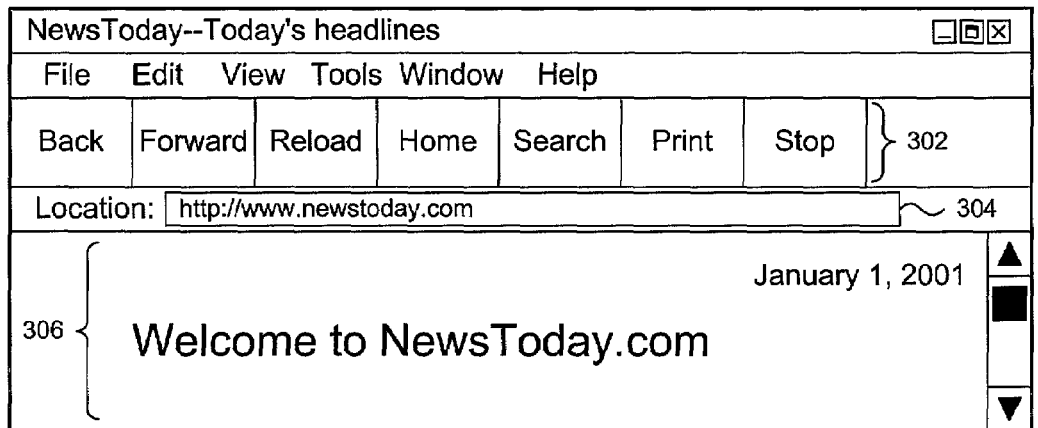
FIG. 3A is a diagram that depicts a typical graphical user interface (GUI) window that may be presented to a user by a browser application.

With reference now to FIG. 3A, a diagram shows a typical graphical user interface (GUI) window that may be presented to a user by a browser application. Window 300 contains GUI controls 302 for allowing a user to navigate the World Wide Web. Window 300 also displays the content of a retrieved Web page, as identified by the Web page's URL 304, within content area 306.

Figure 3B:
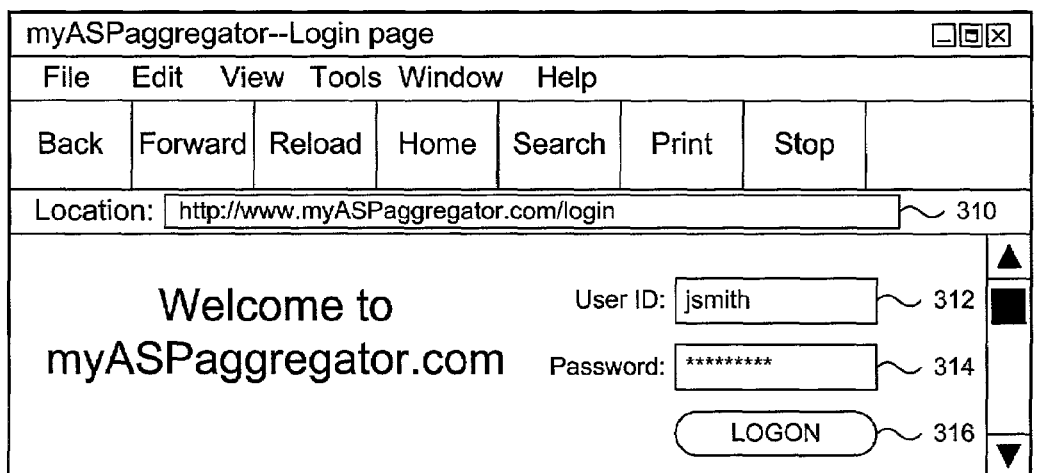
FIG. 3B is a diagram that depicts a typical browser application window after accessing a Web site for an ASP aggregator service.

With reference now to FIG. 3B, a diagram shows a typical browser application window after accessing a Web site for an ASP aggregator service. Window 300 contains URL 310 that identifies a login page from an ASP aggregator service's Web site. The content area of window 300 contains an HTML form that a user may use to submit user identifier 312 and user password 314 by selecting "LOGON" button 316; the user identifier and password are used by the ASP aggregator service to authenticate the user, after which the single-sign-on functionality of the ASP aggregator service performs any subsequent authentication operations with aggregated applications on behalf of the user. Other information, such as the user's corporation, division, etc., may also be required to be entered as necessary in order to authenticate the user.

Figure 3C:
FIG. 3C is a diagram that depicts a typical browser application window after successfully authenticating to an ASP aggregator service.

With reference now to FIG. 3C, a diagram shows a typical browser application window after successfully authenticating to an ASP aggregator service. Window 300 contains URL 320 that identifies an application workspace page that has been received and displayed by the browser application; this particular Web page may have been dynamically generated in response to the user's successful authentication by the ASP aggregator service. After determining the applications for which the user has an active subscription, hyperlinks 321-323 to those applications have been inserted into the user's application workspace page.

Figure 3D:
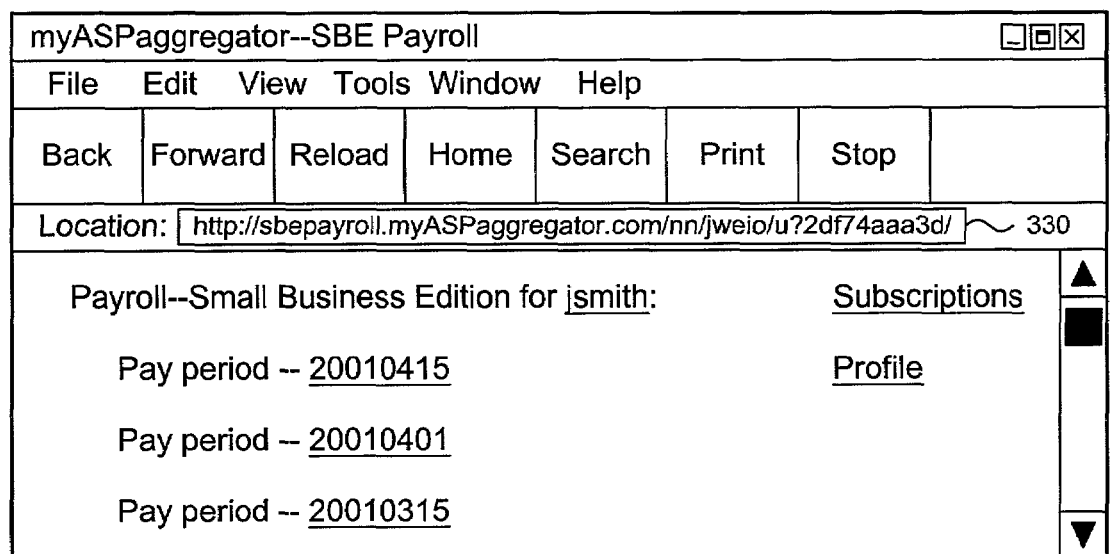
FIG. 3D is a diagram that depicts a typical browser application window after a user has requested to access an aggregated application.

With reference now to FIG. 3D, a diagram shows a typical browser application window after a user has requested to access an aggregated application. Window 300 contains URL 330 that identifies a main page for the aggregated application that was chosen by the user by selecting hyperlink 323 within the Web page that is shown in FIG. 3C. Since the user has already been authenticated by the ASP aggregator service, the user does not need to perform another authentication process with the selected application because the ASP aggregator service performs any subsequent authentication processes on behalf of the user as part of its single-sign-on functionality. The manner in which the user's client and the servers of the ASP aggregator service infrastructure interact is shown in more detail in FIG. 3E.

Figure 3E:
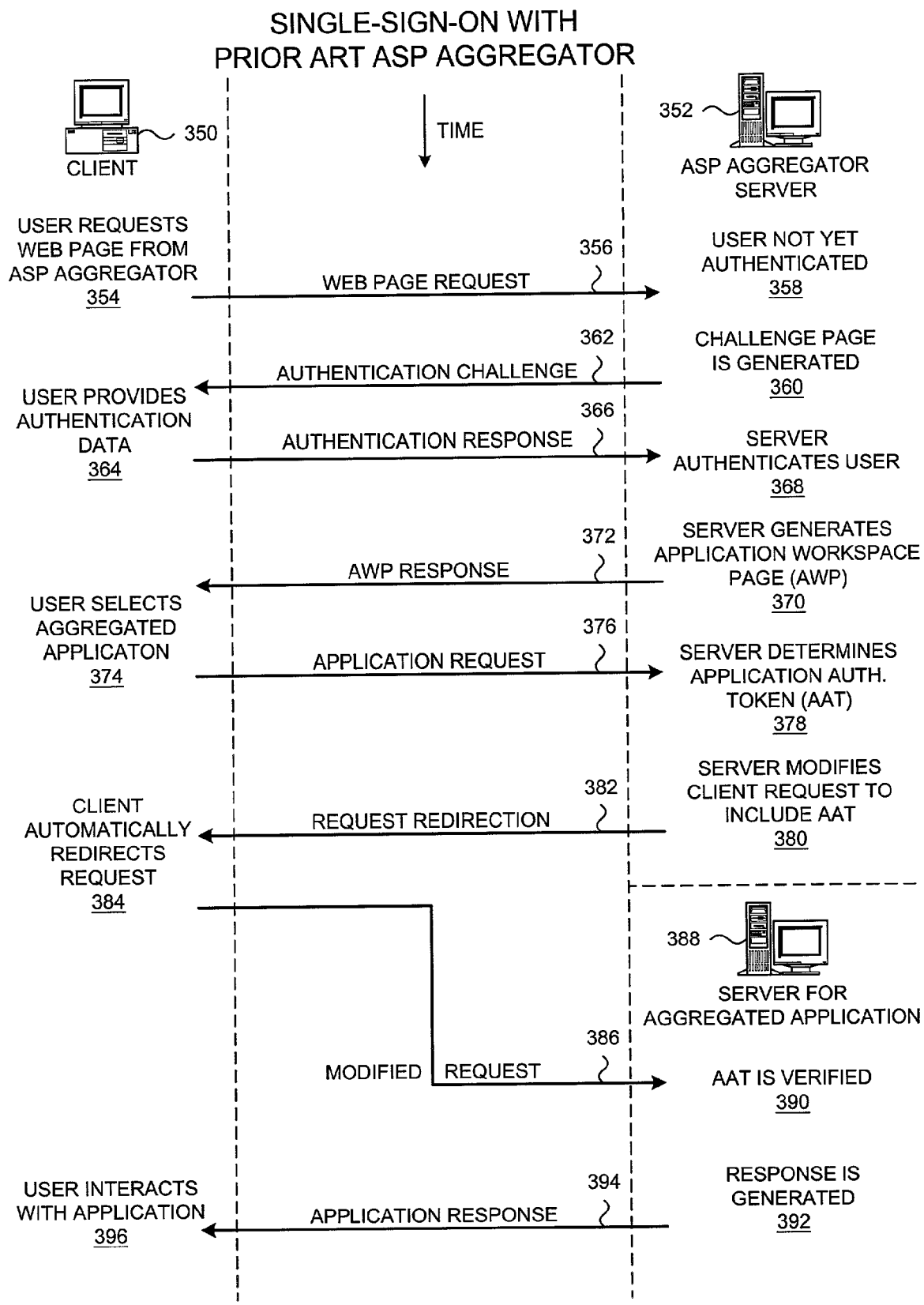
FIG. 3E is a temporal flow diagram that depicts some of the actions and communication traffic for a typical single-sign-on operation with a typical ASP aggregator service.

With reference now to FIG. 3E, a temporal flow diagram shows some of the actions and communication traffic for a typical single-sign-on operation with a typical ASP aggregator service. The actions and operations shown in FIG. 3E depict the underlying processing that may be necessary in order for the user to be presented with the Web pages shown in FIGS. 3A-3D. Although the following examples employ a browser application, other types of client applications that interact with an ASP aggregator service may also be used, as mentioned above with respect to FIG. 2B. In addition, various document formats and communication protocols may be used as is well-known in the art.

A user of client device 350 desires to access an aggregated application via an ASP aggregator service that is supported by server 352. In one of a variety of well-known manners, the user directs a browser application to a Web page that is available from the ASP aggregator service (step 354), which causes a Web page request to be sent to the ASP aggregator service (step 356), most likely in the form of an HTTP Request message. More generally, the user may request some type of computational resource that is protected by the ASP aggregator service.

The ASP aggregator service determines that the user/client has not yet been authenticated with the ASP aggregator service (step 358) and generates an authentication challenge, e.g., a logon page (step 360), after which the logon page is sent to the client (step 362), most likely in the form of an HTML form document within an HTTP Response message.

After the user's browser application has displayed the HTML form document, the user can enter authentication data (step 364) and select a control to submit the authentication data (step 366). After the ASP aggregator service has authenticated the user (step 368), an application workspace page is generated (step 370) and returned to the client (step 372). After selecting a hyperlink that represents the user's choice of an aggregated application to be used (step 374), an application request message is returned to the ASP aggregator service (step 376), which then determines the selected application from the requested URL that is returned in the HTTP Request message. The ASP aggregator service then generates an application authentication token (AAT) that is appropriate for the user and the selected application (step 378). The client's request is then modified to include the application authentication token in an appropriate manner (step 380), and the ASP aggregator service returns the modified request as an HTTP Redirect message that is directed to a specific URL that is associated with the user's requested application (step 382).

Assuming that the HTTP protocol is being used for communication between the entities shown in FIG. 3E, the ASP aggregator service's server may use an HTTP Redirect message. An HTTP Redirect allows a server to respond to a client request with instructions to load a resource at a different location, and in response, most browsers will automatically request the new resource in response to a redirect. When the browser receives the HTTP Redirect, the browser issues a new HTTP Request using the redirected URI or URL provided in the HTTP Redirect.

In response to receiving the modified request, the client automatically redirects the request to the indicated URL (step 384) by sending an appropriate HTTP message through the network (step 386). The request is routed to server 388 that receives data traffic for the indicated URL, which in this case is also a server that supports, in some manner, the aggregated application requested by the user. The application authentication token that was placed into the modified request is then verified (step 390). Assuming that the verification process is successful, then a response is generated (step 392) and returned to the client (step 394). The response would include some type of HTML document that is presented to the user by the client's browser application, and the user can then interact with the selected, aggregated application through a series of GUI actions as is well-known in the art (step 396).

It should be noted that a typical ASP aggregator may use a variety of security techniques to ensure the integrity of its operations and its communications. For example, when the ASP aggregator service sends the initial logon page to the client, shown as step 362 in FIG. 3E, the server at the ASP aggregator service and the client may first establish a secure HTTPS session in which subsequent communications between the client and the server are encrypted. Assuming that the logon operation is being implemented in a lightweight manner, the logon request may be a simple request to access a markup language document that represents a login Web page. In this manner, the client does not require a dedicated logon application to have been previously installed, and the ASP aggregator service can rely upon standard functionality in a typical browser application on the client machine to support the logon process. In an alternative implementation, the ASP aggregator service could send a logon applet to the client, and the logon applet could comprise cryptographic functionality to handle a message authentication code (MAC) from the client to the server. These encryption techniques are well-known in the art and have not been shown in the figures.

Moreover, it should be noted that the ASP aggregator service shown in the figures may employ a variety of models for its security operations. For example, a typical pull model allows an ASP, i.e. an entity that is hosting a net-sourced application, to pull authentication information from the ASP aggregator based on references or tokens that have been presented by a client to the ASP. Alternatively, a typical push model allows the ASP aggregator to push authentication information to an ASP such that the ASP may already possess any necessary authentication information that is associated with references or tokens that are subsequently presented by a client to the ASP. As another alternative, the use of an ASP aggregator between a user and an ASP does not preclude the use of a third-party security service for handling credentials in some manner.

It should also be noted that the ASP aggregator service shown in the figures may use a variety of mechanisms for storing and communicating tokens among the clients and servers. The protocols for communicating security information, which may include tokens, may correspond with a particular security model in the set of security models that were mentioned above. Messages may be formatted in accordance with Security Assertion Markup Language (SAML), Security Service Markup Language (so-called "S2ML"), Information Technology Markup Language (ITML), or other markup languages or formats as necessary.

The data format of any tokens may vary depending upon system implementation in accordance with proprietary or standard formats. For example, a token may also include an optional timestamp for publicly indicating and limiting the useful lifetime of the token. A token may be formatted as a binary string, as an encoded ASCII string, or in some other interpretable format. A token may be optionally formatted in accordance with various standards, such as PKCS (Public Key Cryptography Standards) specifications for enveloped data. In other words, any information within a token may be encrypted to hide the information so as to limit the risk that it might be misappropriated. It should be noted either that the entire token can be an encrypted data item or that individual data items can be encrypted and then placed within the token.

As is well-known, tokens may be implemented in a variety of forms. For example, a token may be associated with a user or client by appending a string that represents the token to a URL (or URI) string within a message from a server, so-called "URL stuffing". When a receiving entity examines the URL string, the portion of the URL string that represents the token can easily be separated from the portion of the URL string that identifies the resource that is being requested.

Alternatively, tokens may be implemented as cookies. As is well known, a cookie is a data item that is stored on a client by a server through a particular user's web browser. When a user of a client machine visits a Web server, the server may return a cookie to the user's browser to be stored in a client-side cookie cache. When a cookie is "set", i.e. stored, as part of an HTTP transaction, it may include the path, i.e. domain, for which the cookie is valid, the cookie's name and value, and other optional attributes, such as the cookie's expiration date. In most cases, the client browser automatically stores the cookie data by default, sometimes without giving the user the option or the knowledge of it being done. When the client/user "revisits" a domain that was associated with the cookie, the cookie is automatically sent with any messages that are addressed to the domain, thereby identifying the client/user to the server that supports the domain. Generally, possession of a cookie is not equated with proof of identity for various security reasons. Cookies can be either persistent cookies, which are stored on disk and persist between browser sessions, or memory cookies, which are stored in volatile memory and are active only for a current browser session. Persistent cookies typically reside in a client file, such as "cookies.txt", after the browser application has been terminated and are available during the next browser session.

It should be understood by one of ordinary skill in the art that user and client are relatively interchangeable. For example, in some instances, the user may initiate a process, and in other instances, a client may automatically initiate a process on behalf of the user. When a user is described as being the destination or origination of some form of data, the client receives and sends the data on behalf of the user. Hence, a cookie or a token can be described as being associated with a client or with a user.

During interaction with the aggregated application, shown as step 396 in FIG. 3E, the user may save session-specific information or information about the aggregated application which is later presented by the user to the application or which allows the user to attempt to interact with the application directly. For example, the user may save a URL for a Web page that was displayed while the user was interacting with the application; typically, browser applications have a "bookmark" operation that conveniently allows a user to save the URL of a Web page. In the context of using the ASP aggregator service to implement single-sign-on functionality, a previously authenticated user may use a bookmarked URL from a Web page associated with an aggregated application while the user's current session is active.

At some point in time, however, the user's session will be terminated, e.g., by a logout operation or by closing the client browser application. Thereafter, the user may restart the browser application, and any subsequent attempt by the user to interact with the aggregated application will fail. For example, if the user attempts to access the aggregated application through the bookmarked URL, even if the bookmarked URL comprises a previously valid application authentication token, then an error will occur because the user's previous session has ended; the application authentication token that is used to identify an authenticated user, shown being returned in step 382 in FIG. 3E, will generally be session-based and, therefore, not valid between sessions. If the user attempts to interact directly with the aggregated application in some other manner, such as by directing a browser application to the aggregated application by entering a URL or a portion of a URL that identifies the aggregated application in some manner, then an error will also occur because the request will not be accompanied by any instance of an application authentication token. In other words, the user will not be able to interact directly with the aggregated application until the user has completed another authentication operation with the ASP aggregator service.

In order to solve the problem in which a user attempts to interact directly with an ASP without using an ASP aggregator service as an intermediate agent, the present invention offers a dynamic identification of the ASP aggregator service to which the user subscribes so that the user can be directed to complete the single-sign-on operation at the ASP aggregator service. In this manner, the present invention is intended to be able to be integrated into a variety of configurations for ASP aggregator services in order to solve the above-identified problem among ASP aggregator services, as discussed in more detail below.

The present invention introduces an aggregator token that is returned to the client/user by the ASP aggregator service in response to a successful, initial, authentication operation. When the ASP aggregator service generates an aggregator token for the client/user, an appropriate address is included in the aggregator token. The address in the aggregator token identifies a logon application, a logon start page, or similar logon resource to which the client/user needs to be directed in order to complete the authentication operation that is provided as part of the single-sign-on functionality of the ASP aggregator service.

The client stores the aggregator token and forwards the aggregator token with each request to the ASP aggregator service's infrastructure, including the ASPs that have been aggregated into the ASP aggregator service. The aggregator token is also sent to an ASP along with any request message that is sent to the ASP while the user is attempting to interact with an aggregated application that is supported by the ASP. Hence, even if a user attempts to interact directly with an ASP in some manner without using the single-sign-on feature of the ASP aggregator service, i.e. without having been authenticated by the ASP aggregator service, then the ASP can examine the aggregator token and determine the ASP aggregator service to which the client/user should be redirected in order to complete the single-sign-on process at the ASP aggregator service. After the client/user has completed the authentication operation at the ASP aggregator service, then the client/user can be redirected back to the originating ASP so that the user can interact with the desired aggregated application.

Figure 4:
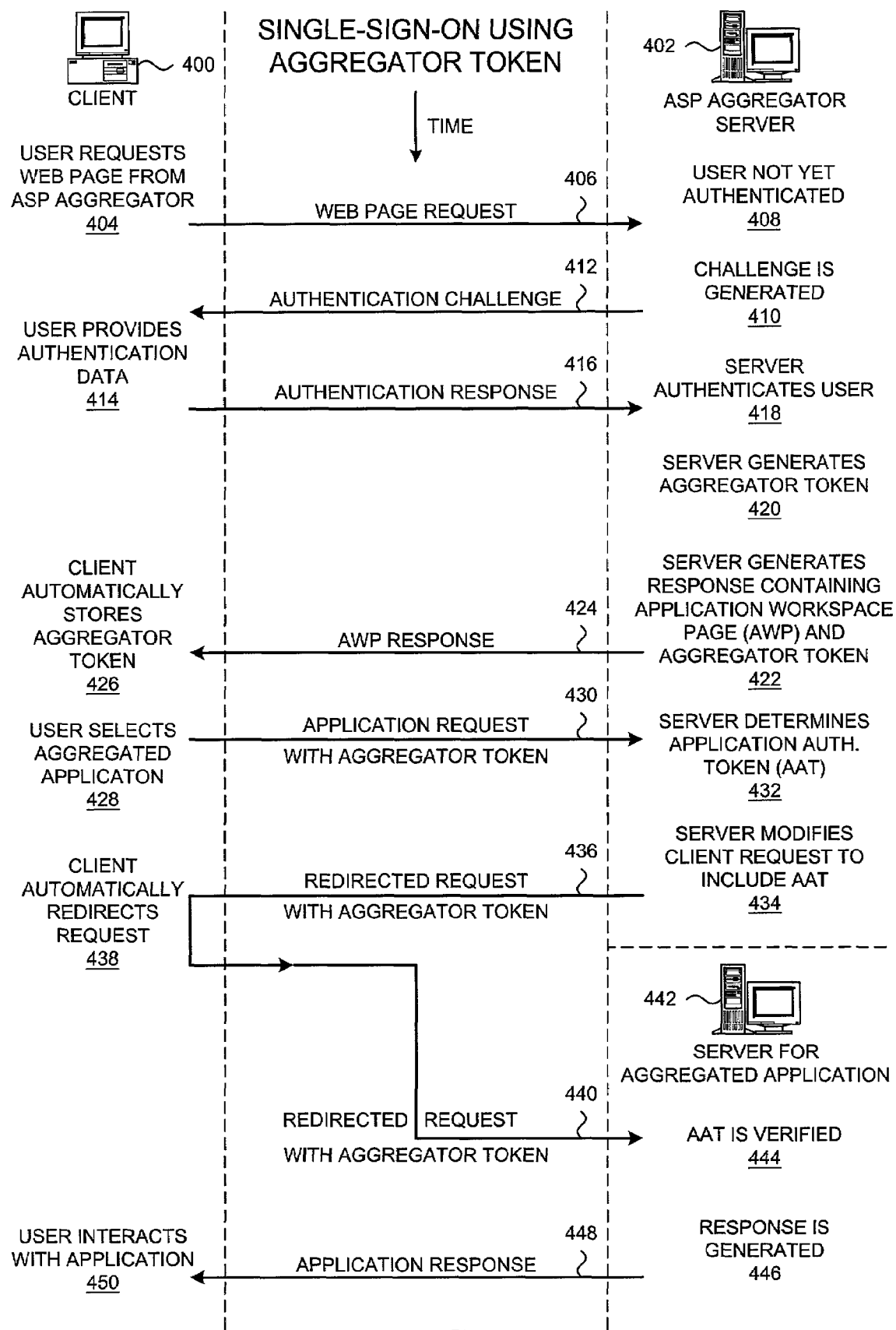
FIG. 4 is a temporal flow diagram that depicts some of the actions and communication traffic for a single-sign-on operation with an ASP aggregator service that is implemented in accordance with the present invention.
Figure 5A:
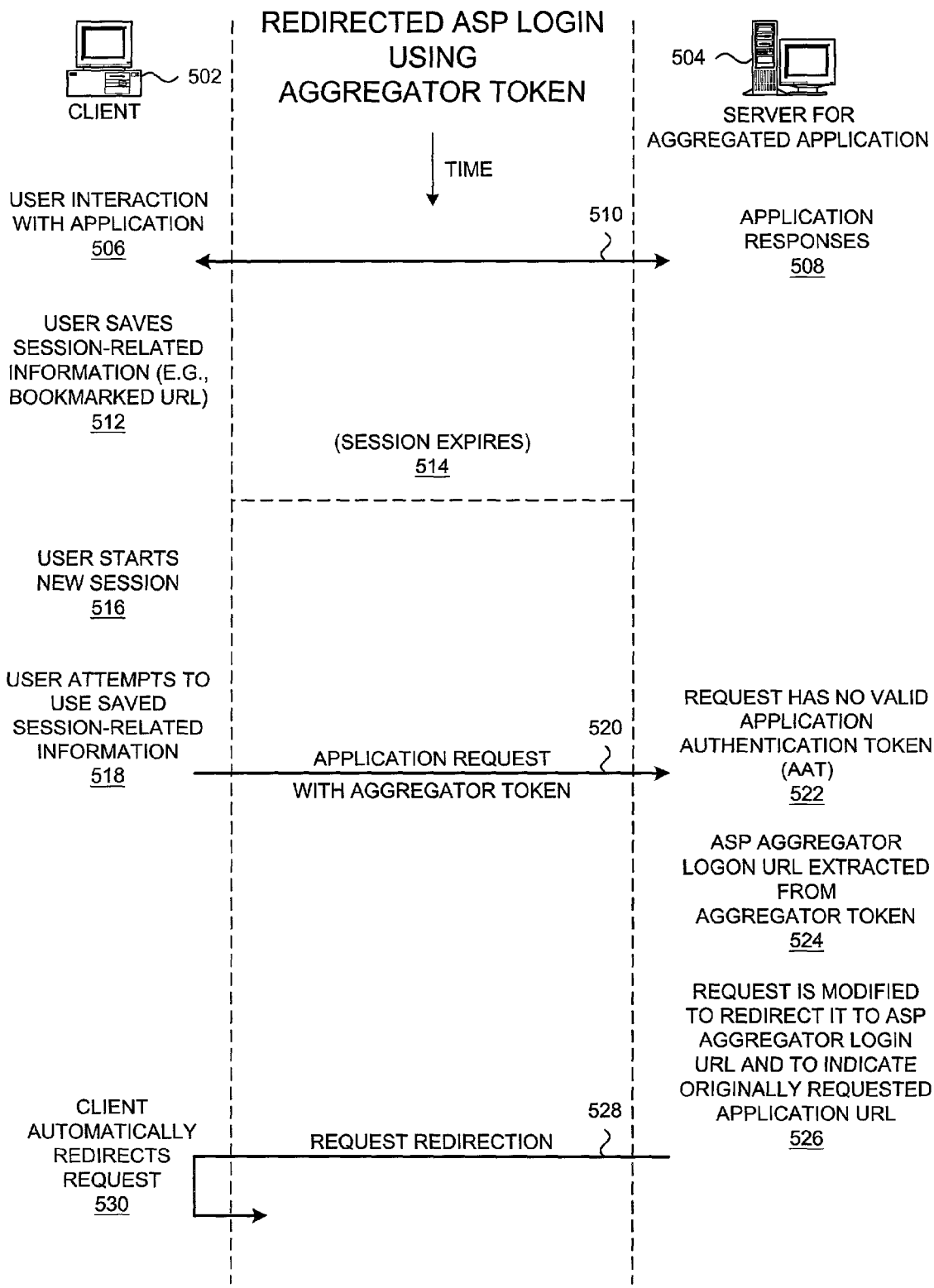
FIGS. 5A-5B are temporal flow diagrams that depict some of the actions and communication traffic for a scenario in which an ASP aggregator service's infrastructure employs an aggregator token in accordance with the present invention to recover from a user's attempted interaction with an aggregated application without the user having been previously authenticated through the ASP aggregator service.
Figure 5B:
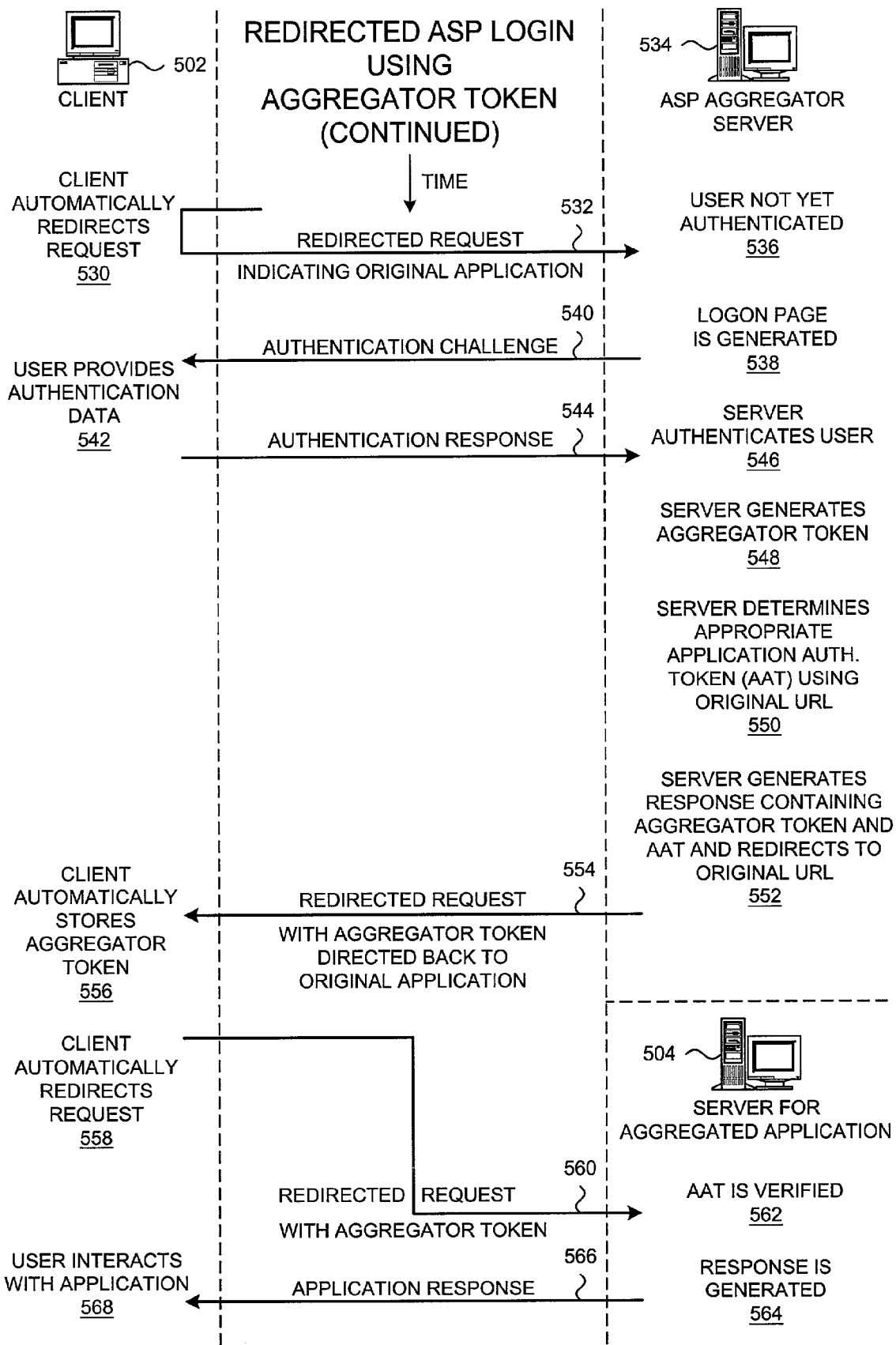

With reference now to FIG. 4, a temporal flow diagram shows some of the actions and communication traffic for a single-sign-on operation with an ASP aggregator service that is implemented in accordance with the present invention. FIG. 4 depicts actions and communication traffic for an ASP aggregator service's infrastructure that uses aggregator tokens; FIGS. 5A-5B then depict some of the actions and communication traffic for a scenario in which an ASP aggregator service's infrastructure employs an aggregator token to recover from a user's attempted interaction with an aggregated application without the user having been previously authenticated through the ASP aggregator service. It should be noted again that the following examples describe an embodiment of the present invention using cookies, HTTP, Web documents, and related standards and protocols, but the depicted examples are not meant to imply architectural or functional limitations with respect to the present invention.

A user of client device 400 desires to access an aggregated application via an ASP aggregator service that is supported by server 402. The user directs a browser application to a Web page that is available from the ASP aggregator service (step 404), which causes a Web page request to be sent to the ASP aggregator service in an HTTP Request message (step 406).

The ASP aggregator service determines that the user/client has not yet been authenticated with the ASP aggregator service (step 408) and generates an authentication challenge page, i.e. logon page (step 410), after which the logon page is sent to the client as an HTML form document within an HTTP Response message (step 412).

After the user's browser application has displayed the logon page, the user can enter authentication data (step 414) and select a control to submit the authentication data (step 416). After the ASP aggregator service has authenticated the user (step 418), the ASP aggregator service generates an aggregator token (step 420).

The aggregator token comprises an address that indicates the logon resource to which a user should be redirected if an ASP, aggregated application, or other entity in the ASP aggregator service's infrastructure determines that the user has not been properly authenticated when processing a request from the user for access to a resource that is supported or protected by the entity that received the request. The specific content of the logon resource indicator may depend upon a variety of factors, such as the protocols that are supported by the ASP aggregator service. Moreover, the logon resource indicator may depend upon the identity of the user; a first set of users may be directed to a first logon resource and should be associated with a first logon resource identifier, whereas a second set of user may be directed to a second logon resource and should be associated with a second logon resource identifier. In the example shown in FIG. 4, the aggregator token is an HTTP cookie comprising a URL of a logon page to which the user should be redirected if the user has not been properly authenticated within the ASP aggregator service's infrastructure; the cookie can be assumed to be associated with a global domain that includes any addresses within the ASP aggregator service's infrastructure.

The ASP aggregator service generates a response that includes the aggregator token and an application workspace page that is specifically tailored for the user (step 422), and the application workspace page is returned to the client (step 424). The client automatically stores the aggregator token in an appropriate manner, such as a permanent cookie cache or token database (step 426). After selecting a hyperlink that represents the user's choice of an aggregated application to be used (step 428), an application request message is returned to the ASP aggregator service (step 430), which then determines the selected application from the requested URL that is returned in the HTTP Request message. The ASP aggregator service then generates an application authentication token (AAT) that is appropriate for the user and the selected application (step 432). The client's request is then modified to include the application authentication token in an appropriate manner (step 434), and the ASP aggregator service returns the modified request as an HTTP Redirect message that is directed to a specific URL that is associated with the user's requested application (step 436).

In response to receiving the modified request, the client automatically redirects the request to the indicated URL (step 438) by sending an appropriate HTTP message through the network (step 440). The request is routed to server 442 that receives data traffic for the indicated URL, which in this case is also a server that supports, in some manner, the aggregated application requested by the user. The application authentication token that was placed into the modified request is then verified (step 444). Assuming that the verification process is successful, then a response is generated (step 446) and returned to the client (step 448). The response would include some type of HTML document that is presented to the user by the client's browser application, and the user can then interact with the selected, aggregated application (step 450).

With reference now to FIGS. 5A-5B, temporal flow diagrams depict some of the actions and communication traffic for a scenario in which an ASP aggregator service's infrastructure employs an aggregator token in accordance with the present invention to recover from a user's attempted interaction with an aggregated application without the user having been previously authenticated through the ASP aggregator service. Referring now to FIG. 5A, client device 502 interacts with server 504 that supports an ASP or an aggregated application, similar to the manner shown in FIG. 4; in response to user actions (step 506), an application can generate responses (step 508), and the requests and responses are depicted as communication traffic 510. During the initial authentication process, an aggregator token would be stored at the client and then subsequently sent along with requests from the client when appropriate. At some point in time during the user interactions, the user saves some type of session-specific information (step 512); for example, the user may bookmark a URL that is associated with an aggregated application.

Eventually, the user's session will expire (step 514), e.g., when the user closes the browser session. At that point in time, the user has severed the association between the user's active session and the user's previous authentication.

At some later point in time, the user can start a new session (step 516), e.g., by starting a new browser session, after which the user may attempt to use the previously saved session-specific information (step 518). For example, the user may attempt to access an aggregated application using a bookmarked URL, which causes the user's browser application to send a request to the specified URL (step 520), and the aggregator token is automatically sent along with the request. After the aggregated application receives the request, it will determine that the request is not accompanied by a valid application authentication token (step 522), and the user is denied access to the application.

Rather than return an error to the user, the aggregator token is examined to determine a logon resource at the ASP aggregator service, such as a URL for a logon page (step 524). After obtaining the URL (or the URI) for the logon resource, the incoming request message (or a newly generated message) can be modified to redirect the client to the logon resource (step 526), thereby causing the client to be forced to complete an authentication operation at the ASP aggregator service. In addition, the message includes the return URL of the aggregated application so that the ASP aggregator service can redirect the client back to the aggregated application after the user has been authenticated.

The functionality for examining the aggregator token does not necessarily need to be incorporated directly into the aggregated application. The aggregated application may be supported by an ASP in which the ASP operates its own servers and infrastructure. An adapter that is associated with the aggregated application can be written or modified to include functionality for checking whether an incoming request has an associated aggregator token and then examining the aggregator token for the address or identifier of the appropriate logon resource.

The redirect message is sent to the client (step 528), and the client automatically redirects the request to the ASP aggregator service as indicated by the URL of the logon resource (step 530). Although it is not necessarily needed by the ASP aggregator service at this stage, the redirected request would preferably be accompanied automatically by the aggregator token; assuming that the aggregator token is implemented as an HTTP cookie, the aggregator token will be automatically sent to the ASP aggregator service.

Continuing with FIG. 5B, redirected request 532 is received by server 534 that is supporting the ASP aggregator service, which determines that the client/user is not properly authenticated (step 536). In a manner similar to that shown in FIG. 4, the ASP aggregator service generates an authentication challenge page, e.g. logon page (step 538), after which the logon page is sent to the client (step 540).

After the user's browser application has displayed the logon page, the user can enter authentication data (step 542) and select a control to submit the authentication data (step 544). After the ASP aggregator service has authenticated the user (step 546), the ASP aggregator service preferably generates a new aggregator token (step 548) to be associated with the client/user; alternatively, if the redirected request that is being processed was accompanied by an aggregator token, then a new aggregator token would not necessarily need to be generated because the client is already storing an aggregator token.

The ASP aggregator service then determines the original aggregated application from which the redirected request was received by examining the original address or URL that was included in the redirected request, and the ASP aggregator service generates an application authentication token (AAT) that is appropriate for the user and the aggregated application (step 550). The client's request is then modified to include the newly generated aggregator token and the newly generated application authentication token in an appropriate manner (step 552), and the ASP aggregator service returns the modified request as a message that is to be directed to the user's originally requested application (step 554).

In response to receiving the modified request, the client automatically stores the newly generated aggregator token in an appropriate manner, such as a permanent cookie cache or token database (step 556). The client then automatically redirects the request to the indicated URL or address (step 558) by sending an appropriate message (step 560). The request is routed to server 504 that receives data traffic for the aggregated application that was originally requested by the user. The application authentication token that was placed into the modified request is then verified (step 562). Assuming that the verification process is successful, then a response is generated (step 564) and returned to the client (step 566). The response would include some type of HTML document that is presented to the user by the client's browser application, and the user can then interact with the aggregated application (step 568).

FIGS. 5A-5B depict a scenario in which an ASP aggregator's infrastructure recovers from a user's attempted interaction with an aggregated application without the user having been previously authenticated through the ASP aggregator service. It should be noted that a slightly different scenario is possible, which is described below.

In this scenario, the user may have been authenticated by the ASP aggregator and may have interacted with a first aggregated application. At some later point in time, in a manner similar to that described above with respect to FIGS. 5A-5B, the user may attempt to interact directly with a second aggregated application using some type of saved session-specific information, e.g., a bookmarked URL that is associated with the second aggregated application. Since the user has attempted to interact directly with the aggregated application without the intermediate step of using the application workspace page, the second aggregated application would not receive an application authentication token along with the client/user request. The second aggregated application would receive and examine the aggregator token, after which the client/user would be redirected to the ASP aggregator.

In contrast to the scenario described with respect to FIGS. 5A-5B, since the client/user has been previously authenticated by the ASP aggregator, the client/user would not receive an authentication challenge from the ASP aggregator. In other words, steps 538-546 in FIG. 5B would be unnecessary. Because the ASP aggregator has already authenticated the client/user, the ASP aggregator would immediately generate the application authentication token that is needed by the client/user with respect to the second aggregated application and then redirect the client/user to the second aggregated application. After the second aggregated application is received and verified, the user may interact with the second aggregated application. Hence, in this scenario, the client's request to the second aggregated application undergoes two redirections, i.e. to and from the ASP aggregator and the second aggregated application, in a manner that should be transparent to the user. In this scenario, the aggregator token enables the user to perform a single sign-on operation yet still jump to direct interaction with aggregated applications without using an application workspace page.

The advantages of the present invention should be apparent in view of the detailed description of the invention that is provided above. The present invention requires minimal modification to an ASP aggregator service's infrastructure. The ASP aggregator service needs to be able to generate an aggregator token, and an aggregated application or its supporting ASP needs to be able to use the aggregator token when necessary. A typical ASP aggregator service's infrastructure can be easily modified to include the functionality of the present invention.

An aggregator token is generated by the ASP aggregator service and sent to the client device of a user that has subscribed to the ASP aggregator service after the user has successfully completed the authentication portion of the single-sign-on feature that is provided by the ASP aggregator service. The aggregator token then accompanies any request from the client to aggregated applications within the ASP aggregator service's infrastructure. The aggregator token comprises an indication of an address or resource identifier within the ASP aggregator service to which a client/user should be redirected to complete the authentication portion of the single-sign-on feature that is provided by the ASP aggregator service. In other words, the address/identifier is associated with a logon resource; when a request from a client is sent to this address, the ASP aggregator service responds with an authentication challenge to force the user to complete a single-sign-on operation.

If an aggregated application (or an ASP that is supporting the aggregated application) determines that the client/user has not been properly authenticated and should not receive access to the aggregated application as requested within a request message that is received from the client/user, then the aggregated application (or its supporting ASP) can redirect the client/user to the logon resource that is indicated by the aggregator token. The redirectable message may itself include an address to which the ASP aggregator service should redirect the client/user after being authenticated so that the user may begin interacting with the desired application.

When the present invention is implemented, a user who attempts to use an aggregated application without being properly authenticated is presented with a logon page rather than an error page. After submitting authentication data, the user is then presented with the desired application. In this manner, the user is not burdened with understanding the operation of the ASP aggregator service's infrastructure. From one perspective, the aggregator token enables a valid authentication session for the user to be "jump started".

Moreover, an aggregated application or its supporting ASP may be aggregated into multiple ASP aggregator services, each of which may have a unique address for a logon resource. When it is determined that a client or user has not been properly authenticated, then the aggregated application or its supporting ASP needs to be able to determine the appropriate ASP aggregator service to which the client/user needs to be redirected. The aggregator token allows this determination to be performed in a dynamic manner; all of the logic for associating the subscribed users with specific logon resources remains with the ASP aggregator service.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for access management in a distributed data processing system, the method comprising:

receiving from a client a request to access a net-sourced application hosted by an application service provider (ASP), wherein access for the client to the net-sourced application is controlled by the ASP on a subscription basis and wherein the ASP pulls authentication information from an aggregator using tokens that have been presented by the client to the ASP;

extracting a logon resource identifier from an aggregator token that accompanies the request, wherein the aggregator token originated from an ASP aggregator service, wherein the ASP aggregator service provides single-sign-on functionality for a plurality of net-sourced applications, wherein at least one of the net-sourced applications is the net-sourced application hosted by the ASP, wherein a logon resource identified by the logon resource identifier prompts the client or a user of the client to complete an authentication operation, wherein the logon resource identifier is a Uniform Resource Locator, and the logon resource is a logon Web page;

determining that the request was not accompanied with a valid application authentication token;

determining that the client or a user of the client has not been properly authenticated prior to sending a response to the client; and sending to the client a response indicating the logon resource identifier as a redirectable destination.

* * * * *